United States Patent [19]

Skonieczny et al.

[11] Patent Number: 4,893,863

[45] Date of Patent: Jan. 16, 1990

[54] ADJUSTABLE DECK LID HINGE PIVOT

[75] Inventors: Raymond S. Skonieczny, Warren; Douglas A. Ford, Rochester Hills; Robert W. Pryor, Mt. Clemens, all of Mich.

[73] Assignee: General Motors Corporation, Detroit, Mich.

[21] Appl. No.: 306,719

[22] Filed: Feb. 6, 1989

[51] Int. Cl.[4] .......... B62D 25/10

[52] U.S. Cl. .......... 296/76; 16/235; 16/245

[58] Field of Search .......... 296/76; 16/235, 238, 16/242, 245

[56] References Cited

U.S. PATENT DOCUMENTS

| | | | |
|---|---|---|---|
| 2,120,685 | 6/1938 | Soss et al. | 16/288 |
| 2,583,950 | 1/1952 | Kirschner | 16/238 |
| 2,591,979 | 4/1952 | Turley | 49/400 |
| 3,152,355 | 10/1964 | Ferguson | 16/238 |
| 4,124,954 | 11/1867 | Redick | 49/236 |
| 4,186,476 | 2/1980 | Mair et al. | 29/407 |
| 4,646,472 | 3/1987 | Sugawara | 49/386 |

FOREIGN PATENT DOCUMENTS

| | | | |
|---|---|---|---|
| 208085 | 1/1987 | European Pat. Off. | 16/235 |
| 3100138 | 8/1982 | Fed. Rep. of Germany | 16/245 |
| 3712216 | 10/1988 | Fed. Rep. of Germany | 296/76 |

*Primary Examiner*—Johnny D. Cherry
*Assistant Examiner*—Andrew C. Pike
*Attorney, Agent, or Firm*—William A. Schuetz

[57] ABSTRACT

The present invention relates to an adjustable hinge assembly and, more particularly, to an adjustable hinge assembly for a vehicle closure or deck lid which can be readily, vertically adjusted to enable the closure or deck lid to be positioned so as to be flush with adjacent quarter panels of the vehicle when in its closed position.

3 Claims, 3 Drawing Sheets

ADJUSTABLE DECK LID HINGE PIVOT

The present invention relates to an adjustable hinge assembly and, more particularly, to an adjustable hinge assembly for a vehicle closure or deck lid which can be readily, vertically adjusted to enable the closure or deck lid to be positioned so as to be flush with adjacent quarter panels of the vehicle when in its closed position.

It is common to provide a pair of hinge assemblies for swingably mounting a closure, such as a deck or trunk lid to body structure of an automotive vehicle to enable the deck lid to be swingably moved between open and closed positions. These known hinge assemblies have included hinge boxes which are mounted to the vehicle body structure, such as an inner shelf panel, horizontally disposed hinge pins or pivots carried by the hinge boxes and straps having one end connected or mounted to the deck lid and their other ends pivotally connected to the hinge pins. In order for the deck lid to be properly aligned with the adjacent exterior body structure, including the rear quarters, it is common to provide an adjustment means to enable the deck lid to be adjusted side to side and fore and aft of the quarter panels. One way to achieve this adjustment is to provide oversize holes or slots in the inner panel of the deck lid or in the straps to enable the deck lid to be shifted somewhat relative to the straps prior to tightening down fasteners passing through holes in the strap and the inner panel of the deck lid. Heretofore, flushness between the exterior surface of the deck lid and rear quarter panels has been achieved by vertically adjusting the position of the deck lid latch carried by the rear body structure of the vehicle and by adjusting the vertical position of the hinge boxes on the vehicle body support structure or inner shelf panel via vertical slots in the support or brackets of the hinge box and then clamping the same together via bolts.

The present invention provides a hinge assembly for a closure or deck lid of an automotive vehicle which has a novel adjustment means for readily, vertically positioning the deck lid so that it can be flush with the adjacent quarter panels of the vehicle and which does not require adjusting the position of the hinge box so that the latter can be preassembled or welded to the support structure prior to installation of the deck lid.

Accordingly, an important object of the present invention is to provide a new and improved hinge assembly for a closure or deck lid of an automotive vehicle which has a novel adjustment means for readily, vertically positioning the deck lid so that it can be flush with the adjacent quarter panels of the vehicle and which does not require adjusting the position of the hinge box so that the latter can be preassembled or welded to a support structure prior to installation of the deck lid.

Another object of the present invention is to provide a new and improved hinge assembly, as defined in the preceding object, and in which the hinge boxes have vertically extending slots in their sides through which a horizontally disposed hinge pin or pivot means extends and in which the adjustment means comprises an eye bolt having one end surrounding the hinge pin and with the other end being threaded and extending through an opening in the top of the hinge box and a nut means for threadably engaging the threaded end of the eye bolt to effect raising and lowering movement of the eye bolt and the hinge pin or pivot means and hence, the vertical position of the deck lid.

Yet another object of the present invention is to provide a new and improved hinge assembly, as defined in the next preceding object, and in which the hinge pin or pivot means is threaded at one end to receive a threaded nut or fastener means to enable the same to be clamped against the sides of the hinge box to lock the same in its vertical position.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
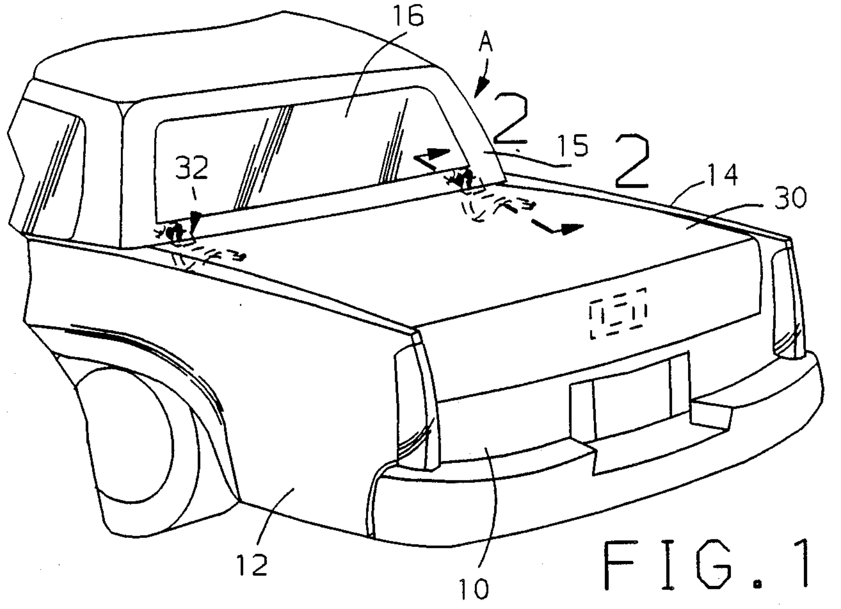
FIG. 1 is a fragmentary rear perspective view of a vehicle having a deck lid and incorporating the novel hinge assembly of the present invention.
Figure 2:
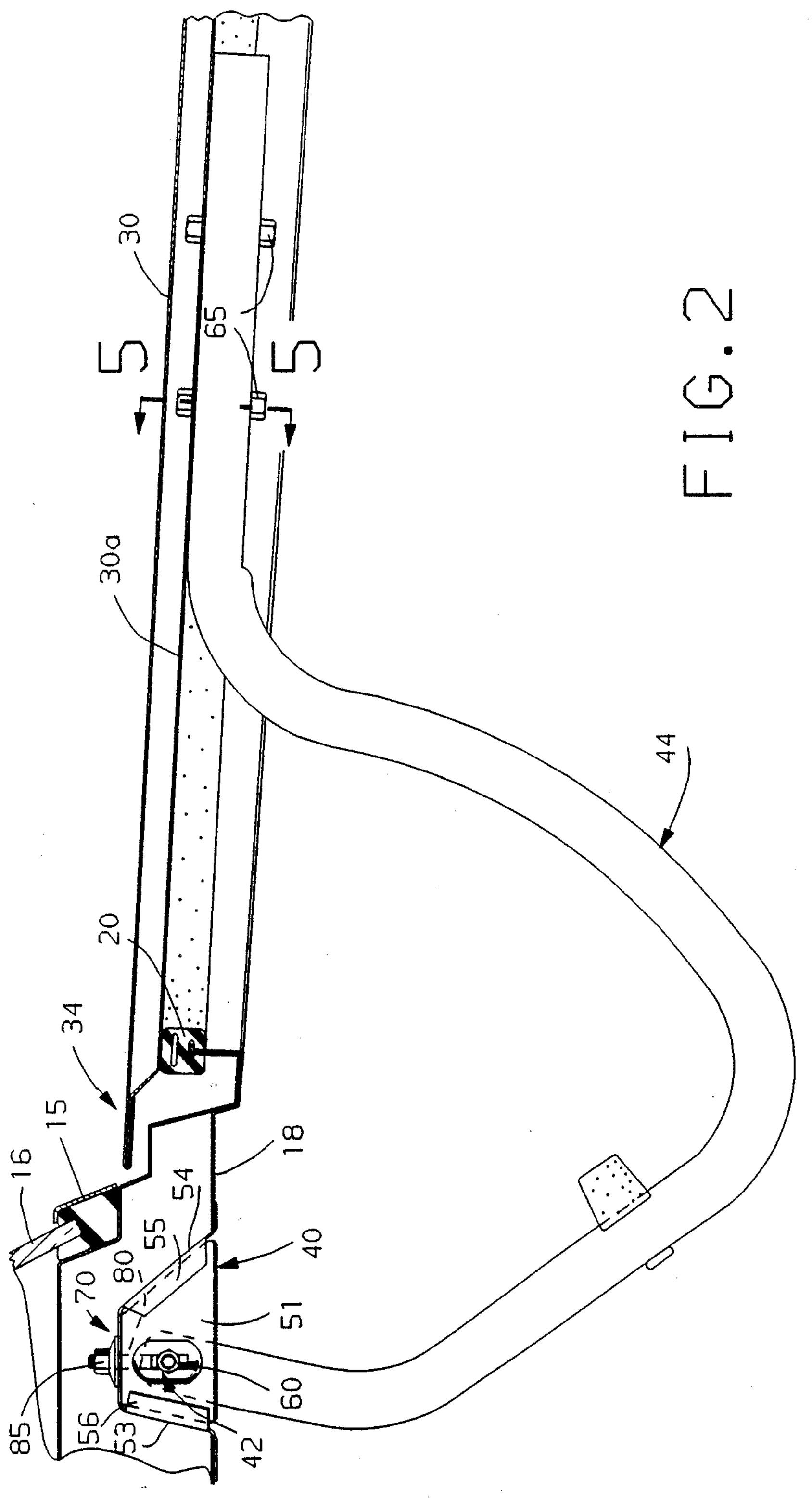
FIG. 2 is an enlarged fragmentary sectional view taken along the lines 2—2 of FIG. 1.

Referring to FIG. 1 of the drawings, an automotive vehicle A is thereshown. The vehicle A has vehicle body structure including a rear 10 extending transversely of the vehicle, a pair of side rear quarter panels 12 and 14, transverse body structure 15 defining an opening for a rear window 16 and a transversely extending support or inner shelf panel 18 (see FIG. 2) downwardly adjacent from the rear window 16. The side rear quarter panels 12 and 14, the rear 10 and the transverse body structures 15 and 18 define a rear compartment or trunk opening and together at upper ends thereof carry a circumferentially extending seal 20 surrounding the trunk compartment. The vehicle A additionally includes a rear deck lid or trunk lid 30 which is swingably mounted to the inner shelf panel 18 via a pair of hinge assemblies 32, 34 for movement between a closed position, as shown in FIG. 1, in which the deck lid 30 closes off access to the rear compartment and engages the seal 20, and an open position (not shown) to provide access to the rear compartment. The rear deck lid 30 is adapted to be latched in a closed position thereof, as shown in FIG. 1, via a suitable latch mechanism (not shown) when the deck lid 30 is moved to the closed position thereof.

The hinge assemblies 32 and 34 are of an identical construction and hence only the hinge assembly 34 will be described in detail. The hinge assembly 34 comprises, in general, a hinge box 40, a hinge pin or pivot means 42, and a goose neck shaped hinge strap 44 having one end which is adapted to be bolted or secured to an underside of the deck lid 30 and another end pivotally connected to the hinge pin 42.

Figure 3:
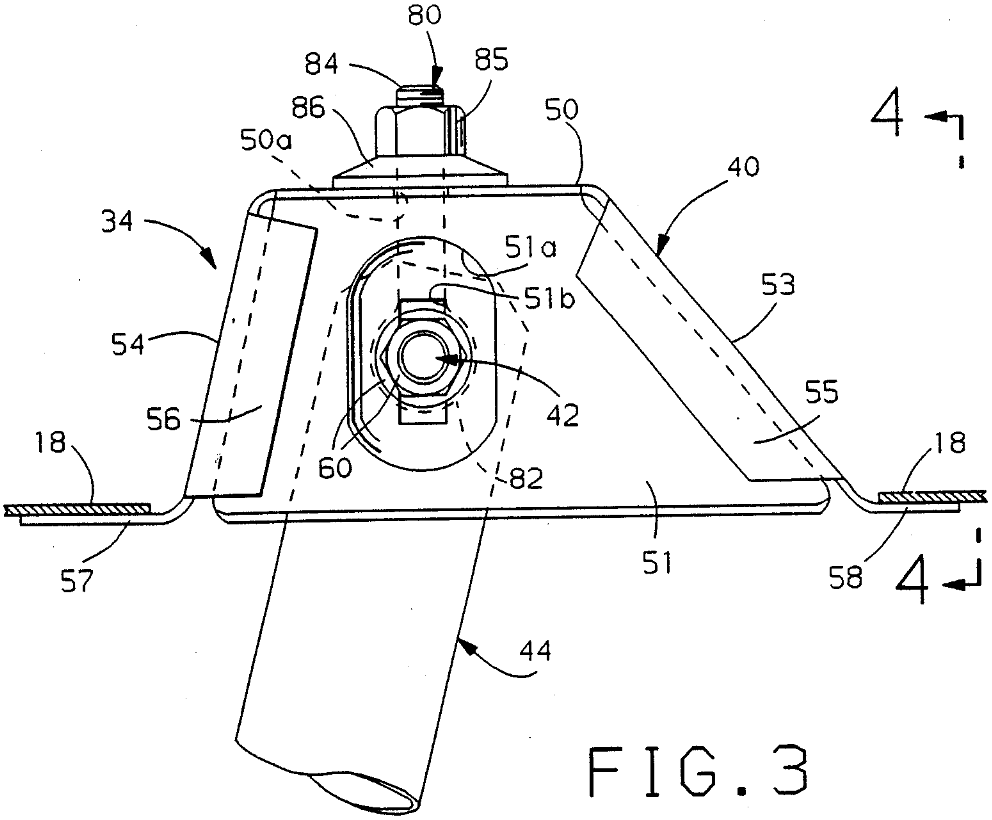
FIG. 3 is a fragmentary side elevational view, with part shown in section, of part of the hinge assembly shown in FIG. 2.
Figure 4:
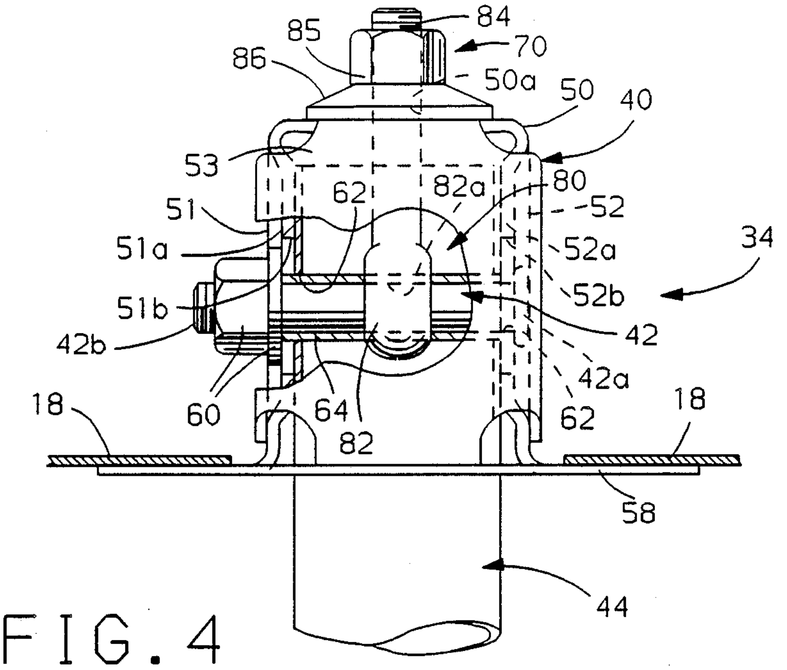
FIG. 4 is a fragmentary rear elevational view, with parts broken away or shown in section, and looking in the direction of the arrows 4—4 of FIG. 3.

As best shown in FIGS. 3 and 4, the hinge box 40 comprises a suitable sheet metal stamping, preferably made from steel, which is bent or shaped to the configuration shown in FIGS. 3 and 4. The hinge box comprises a top 50, a pair of vertically extending sides 51 and 52 and rear and front ends 53 and 54. The hinge box 40 is generally of a trapezoidal shape and the ends 53 and 54 have ears 55 and 56, respectively along sides thereof which are bent over and engage the sides 51 and 52 of the hinge box 40, respectively. The ears 55 and 56 are adapted to be suitably welded to the sides 51 and 52 of the hinge box 40. In addition, the rear and front ends 53 and 54 of the hinge box 40 at free ends are provided with planar flanges 58 and 57, respectively, to enable the hinge box 40 to be welded, as shown, or to be bolted to the inner shelf panel or support 18 of the vehicle A. Further, the sides 51 and 52 of the hinge box are provided with generally oval shaped depressions *51a* and *52a*, respectively, and the depressions *51a* and *52a* having aligned openings *51b* and *52b*, respectively.

The hinge box 40 supports the hinge strap 44 and the hinge pivot or pivot means 42. The hinge pin 42 comprises a circular bolt-like member having a head *42a* which is adapted to engage the side 52 of the hinge box 40 and is threaded at another end as indicated by reference numerals *42b*. The hinge pin 42 extends through the aligned openings *52b* and *51b* in the sides 52 and 51 of the hinge box and is adapted to be clamped in place by a suitable locknut and washer 60. When the hinge pin 42 is clamped in place, it remains stationary with the hinge box 40. The hinge strap 44 is hereshown as being tubular and, at an inner end thereof, has a pair of aligned openings 62 through which the hinge pin 42 extends. Preferably, the hinge pin 42 would carry a suitable antifriction bushing 64 which also extends through the aligned openings 62 in the hinge strap 44. It should be understood, however, that the bushing 64 could be eliminated, if desired.

Figure 5:
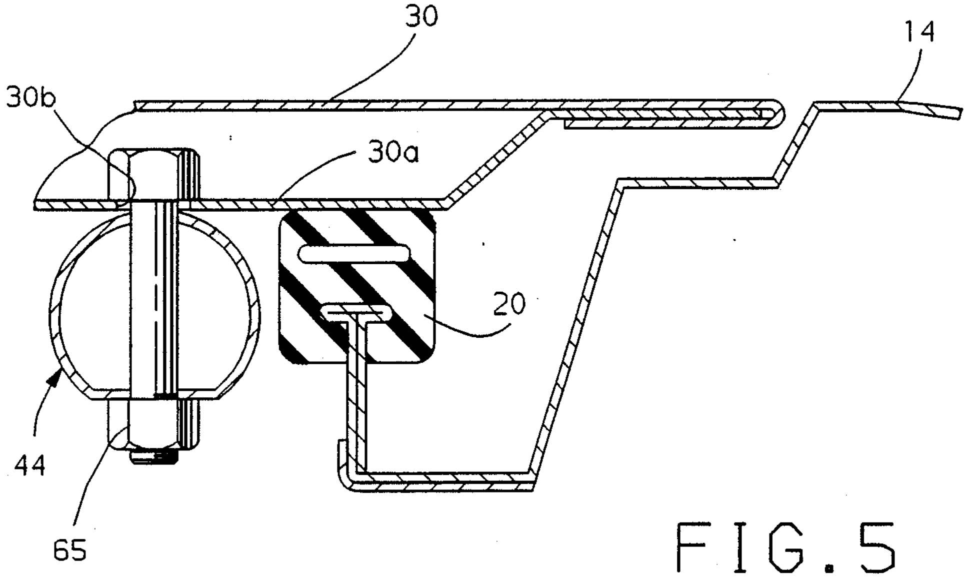
FIG. 5 is a fragmentary sectional view looking in the direction of the arrows 5—5 of FIG. 2.

The hinge strap 44 at a rear end is partially flattened (see FIG. 5) and is adapted to be suitably bolted to an inner panel *30a* of the deck lid 30 via a suitable bolt or fastener 65. As is conventional in the art, the inner panel *30a* of the deck lid 30 would be provided with either oversize or slotted openings *30b* to enable the deck lid 30 to be slightly adjusted side to side between the rear quarter panels 12 and 14 and fore and aft of the rear quarter panels 12 and 14 for proper alignment purposes prior to the fastener 65 being tightened down to secure the deck lid 30 to the hinge strap 44. In addition, as is conventional in the art, the deck lid latch mechanism (not shown) at the rear end 10 of the vehicle would be vertically adjustable to position the rear end of the deck lid 30 vertically vis-a-vis the quarter panels 12 and 14 so as to effect proper alignment and flushness therewith. Since these adjustments are conventional in the art, they have not been shown in detail in the drawings and will not be described in detail.

In accordance with the provisions of the present invention, a novel vertical adjustment means 70 is provided to enable the deck lid 30 at an end thereof adjacent the rear window 16 to be readily positioned so as to be flush with an the adjacent exterior surface of the vehicle, i.e., the rear quarter panels 12 and 14. To this end, the openings *51b* and *52b* in the sides 51 and 52 of the hinge box 40 are in the form of vertically extending slots instead of just being circular openings and an eye bolt 80 is provided. The eye bolt 80 at a lower end thereof has an eye or ring 82 to define a through opening *82a* through which the hinge pin 42 and bushing 64 extend and has an upper threaded end 84 provided with a screw thread. The upper end 84 of the eye bolt 80 extends through an opening *50a* in the top 50 of the hinge box 40 and is threadably connected to a nut 85. A suitable washer 86 is interposed between the top of the hinge box 40 and the nut 84.

During assembly of the rear deck lid 30 to the vehicle A, the vertical position adjacent the rear window 16 of the deck lid 30 can be readily adjusted by having the backnut and washer 60 loose on the hinge pin 42 and by suitably rotating the nut 85 on the threaded portion 84 of the eye-bolt 80. This enables the axis of the hinge pin 42 to be vertically adjusted until the deck lid 30 is flush with the adjacent quarter panels 12 and 14 of the vehicle. When the proper adjustment is effected, the locknut and washer 60 can be tightened to lock the hinge pivot 42 in place on the hinge box 40. Thus, even if the adjusting nut 85, at some subsequent time, should become loosened, it will not affect movement of the hinge pin 42, since it will be locked in place on the hinge box 40 by the locknut and washer 60.

An important advantage of the above-noted vertical adjustment means 70 for the rear deck lid 30 of the vehicle A is that the hinge box 40 can be preassembled in place on the inner shelf panel 18 and thereafter the deck lid 30 adjacent the end near the rear window 16 can be readily adjusted vertically by merely rotating the nut 85 and then tightening the locknut and washer 60 after the adjusted position is attained. In addition, it should be apparent that the ready adjustment means 70 is of a very simple and economical construction.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In an automotive vehicle having body structure including spaced side quarter panels and spaced supports extending transversely to said quarter panels which together define a compartment having a top opening, a closure, a pair of spaced hinge assemblies for swingably supporting said closure for movement between an open position to permit access to said compartment and a closed position in which said closure covers said compartment, each of said hinge assemblies comprising a hinge box having spaced vertical sides and top and with the hinge box being mounted to one of said transverse supports, a generally horizontal pivot means extending through aligned openings in the sides of said hinge box, a hinge strap having one end mounted to said closure and another end pivotally connected to said pivot means, and adjustment means for vertically raising and lowering the pivot means and hence the closure so that an exterior surface thereof will be flush with adjacent exterior body structure of the vehicle, the improvement being that the adjustment means for raising and lowering said closure comprises providing vertically extending slots in the sides of said hinge box and providing an eye bolt and nut for raising and lowering said pivot means, said eye bolt at one end being pivotally connected to said pivot means and being threaded at another other end and extending through an opening in the top of said hinge box, said nut being threadably engaged with said threaded end of said eye bolt and engageable with the top of said hinge box, said nut being rotatable to cause said eye bolt and pivot means to be moved vertically within the slots in the sides of the hinge box so that the closure can be raised and lowered at an end thereof adjacent the hinge box to enable the closure to be vertically adjusted so that exterior sides thereof will be flush with the adjacent vehicle body structure.

2. In an automotive vehicle having body structure including spaced rear side quarter panels and spaced supports extending transversely to said quarter panels which together define a trunk compartment having a top opening, a deck lid, a pair of spaced hinge assemblies for swingably supporting said deck lid for movement between an open position to permit access to said compartment and a closed position in which said deck lid covers said compartment, each of said hinge assemblies comprising a hinge box having spaced vertical sides and a top and with the hinge box being mounted to one of said transverse supports, a hinge pivot extending through aligned openings in the sides of said hinge box, a hinge strap having one end mounted to said deck lid and another end pivotally connected to said hinge pivot, and adjustment means for vertically raising and lowering the deck lid so that an exterior surface thereof will be flush with adjacent exterior surfaces of the quarter panels of said vehicle, the improvement being that the adjustment means for raising and lowering said deck lid so that when the deck lid is in a closed position thereof an exterior surface thereof will be flush with the adjacent exterior surfaces of the quarter panels of the vehicle comprises providing vertically extending slots in the sides of said hinge box and providing an eye bolt and nut for raising and lowering said hinge pivot, said eye bolt at one end being pivotally connected to said hinge pivot and having another end threaded and extending through an opening in the top of said hinge box, said nut being threadably engaged with said threaded end of said eye bolt and engageable with the top of said hinge box, said nut being rotatable to cause said eye bolt and hinge pivot to be moved vertically within the slots in the sides of the hinge box so that the deck lid can be raised and lowered at an end thereof adjacent the hinge box to enable the deck lid to be vertically adjusted so that exterior surfaces thereof will be flush with the adjacent exterior body surfaces of the quarter panels of the vehicle, and means for locking said hinge pivot in a vertically adjusted position thereof.

3. In an automotive vehicle, as defined in claim 2, and wherein said locking means comprises a threaded nut threadably engaged with a threaded end of said hinge pivot, said nut being tightened after the hinge pivot is vertically adjusted to clamp the hinge pivot in place on the hinge box.

* * * * *